US009199350B2

(12) United States Patent
Huang et al.

(10) Patent No.: US 9,199,350 B2
(45) Date of Patent: Dec. 1, 2015

(54) MACRO-MICRO ACTUATED DISTENDED GUIDE RAIL PRECISION ROTATION APPARATUS

(75) Inventors: Yumei Huang, Shaanxi (CN); Manzhi Yang, Shaanxi (CN); Xingang Yang, Xi'an Shaanxi (CN); Wenfeng Hou, Xi'an Shaanxi (CN); Weigang Lv, Xi'an Shaanxi (CN); Tongqing Liu, Xi'an Shaanxi (CN); Guangpeng Zhang, Xi'an Shaanxi (CN)

(73) Assignee: XI'AN UNIVERSITY OF TECHNOLOGY, Xi'An Shaanxi (CN)

( * ) Notice: Subject to any disclaimer, the term of this patent is extended or adjusted under 35 U.S.C. 154(b) by 0 days.

(21) Appl. No.: 14/241,935

(22) PCT Filed: Feb. 6, 2012

(86) PCT No.: PCT/CN2012/070897
§ 371 (c)(1),
(2), (4) Date: Apr. 7, 2014

(87) PCT Pub. No.: WO2013/063880
PCT Pub. Date: May 10, 2013

(65) Prior Publication Data
US 2015/0122058 A1 May 7, 2015

(30) Foreign Application Priority Data
Oct. 31, 2011 (CN) .......................... 2011 1 0335074

(51) Int. Cl.
*B23Q 5/22* (2006.01)
*B23Q 5/28* (2006.01)
(Continued)

(52) U.S. Cl.
CPC .. *B23Q 5/28* (2013.01); *B23Q 1/34* (2013.01); *B23Q 1/522* (2013.01); *B23Q 5/22* (2013.01); *F16H 21/16* (2013.01)

(58) Field of Classification Search
CPC .... B23Q 16/06; B23Q 16/065; B23Q 39/042; B23Q 5/28; B23Q 5/22; F16H 21/16
USPC .............................................. 269/57; 74/110
See application file for complete search history.

(56) References Cited

U.S. PATENT DOCUMENTS 7,845,257 B2   12/2010   Kim et al.
2008/0087791 A1   4/2008   Nakajima
(Continued)

FOREIGN PATENT DOCUMENTS

CN        2742216     11/2005
CN       201168875    12/2008
(Continued)

OTHER PUBLICATIONS
International Search Report for PCT/CN2012/070897, English Translation attached to original, Both completed by the Chinese Patent Office on Jul. 16, 2012, All together 8 Pages.

*Primary Examiner* — Lee D Wilson
*Assistant Examiner* — Jamal Daniel
(74) *Attorney, Agent, or Firm* — Brooks Kushman P.C.

(57) ABSTRACT

A guide rail precision rotation apparatus is provided with a housing of torque motor and a bearing housing fixedly arranged on an upper surface of a base, and a bearing sleeved on an inner edge step at the upper end of bearing housing. The inner ring of bearing is sleevingly connected to an intermediate rotating body, the lower end of the body is connected to a bearing inner ring cap; a round grating is provided at an outer edge of lower end of the cap, a connecting piece is arranged on the motor, the lower end of connecting piece is fixedly connected to a rotary shaft of the motor, the connecting piece and the body are both connected to the lower end of a fine movement mechanism, and the upper end face of fine movement mechanism is fixedly connected to a rotary worktable.

5 Claims, 2 Drawing Sheets

(51) Int. Cl.
*B23Q 1/34* (2006.01)
*B23Q 1/52* (2006.01)
*F16H 21/16* (2006.01)

(56) References Cited

U.S. PATENT DOCUMENTS

2014/0053670 A1* 2/2014 Huang et al. .................... 74/110
2015/0040703 A1* 2/2015 Huang ......................... 74/89.33

FOREIGN PATENT DOCUMENTS

| | | |
|---|---|---|
| CN | 101474758 | 7/2009 |
| CN | 101480734 | 7/2009 |
| CN | 201350509 | 11/2009 |
| CN | 102029530 | 4/2011 |
| DE | 102009040030 | 4/2010 |
| JP | 02225854 | 9/1990 |
| TW | 201008699 | 3/2010 |

* cited by examiner

MACRO-MICRO ACTUATED DISTENDED GUIDE RAIL PRECISION ROTATION APPARATUS

CROSS-REFERENCE TO RELATED APPLICATION

This application is the U.S. national phase of PCT Application No. PCT/CN2012/070897 filed on Feb. 6, 2012, which claims priority to CN Patent Application No. 20111033.7 filed on Oct. 31, 2011, the disclosures of which are incorporated in their entirety by reference herein.

BACKGROUND

1. Technical Field

The present disclosure belongs to a technical field of precision numerical control machinery and relates to a macro-micro actuated distended guide rail precision rotation apparatus.

2. Description of the Related Art

With the development of science and technology, there are more and more needs for the precision and ultraprecision numerical control rotation machinery with great rotation range (such as 180 degree, more than 360 degree) and full load (including three forces $F_X$, $F_Z$ and $F_Y$ and three torques $M_X$, $M_Y$ and $M_Z$, total six full loads), for example, the work precision of the precision rotation movement machinery, such as an ultralprecision rotation detection machinery, an ultraprecision rotation transmission machinery and an ultraprecision rotation machining machinery, has entered $10^{-1}$~$10^{-3}$ arc-second (one arc-second, that is, $1^{st}$, about 0.00028 degree) level, hence, precision and ultraprecision numerical control rotation machinery with a level of arc-second~micro arc-second is one of the major development tendencies in high-end numerical control machinery. Actuation, transmission and guide rail devices of the ultraprecision-level numerical control machinery have great influence on the precision of the rotation movement thereof. One of effective ways of improving the precision and ultraprecision numerical control rotation machinery with great rotation range and full load is adopting a macro-micro actuation system which combines a macro actuation with a micro actuation, in which the rotation movement of great range is realized by the macro actuation, and precision and ultraprecision rotation movement of arc-second~micro arc-second level is realized by the micro actuation.

The macro actuation of the rotation movement is actuating an output shaft to rotate generally in an mechanical-electrical integration mode (actuated by a servo motor and transmitted by gear or worm gear machinery); another macro actuation is a direct actuation mode using a torque motor (a direct actuation without any intermediate mechanical transmission links (i.e. zero transmission) realized by integrating a rotor and an output shaft of the torque motor (a servo motor with a high torque) and integrating a stator and a housing thereof). The micro actuation of the rotation movement is generally using a micro actuator, such as a piezoelectric actuator or a magnetostrictive actuator, to allow the rotating body of the micro actuation mechanism to rotate through the stretch (linear movement) of the micro actuator and the transmission of a flexible hinge mechanism. The mode of combining the macro actuation with the micro actuation is the macro actuation and the micro actuation being connected in series, an input end of the micro actuation is connected to an output end (called as a rotating body of the macro movement) of the macro actuation, the output end (a rotating body of the fine movement) of the micro actuation is connected to a rotary worktable.

An external load (including a work load and a weight load) of the rotary worktable generally includes total six full loads, that is, three forces $F_X$, $F_Y$ and $F_Z$ and three torques $M_X$, $M_Y$ and $M_Z$, wherein the macro-micro actuation mechanism bears the external load $M_Z$ in a rotation direction, and a guide rail-pair bears the rest external loads $F_X$, $F_Y$, $F_Z$, $M_X$ and $M_Y$. The movement precision (which can be described by deviations) of the rotary worktable also has six precisions, that is, $e_x$, $e_y$, $e_z$, $e_{\theta x}$, $e_{\theta y}$, $e_{\theta z}$, wherein the precision $e_{\theta x}$ in the rotation direction depends on the micro actuation mechanism, and the rest five precisions (which can be indicated by guide deviations, $e_x$, $e_y$, $e_z$, $e_{\theta x}$, $e_{\theta y}$) depend on the guide precision of the guide rail-pair. The main structure of the current macro-micro actuated rotation apparatus is: a rotation guide rail is disposed between a rotating body of the macro movement and a housing of the macro movement of the macro actuation mechanism only (using a bearing as a rotary guide rail).

SUMMARY

Technical Problem

The defects existing in the prior art are: 1) there is not a guide device for the linear movement of the micro actuator, thereby affecting the movement precision of the fine movement (the linear movement likewise has six deviations, $e_x$, $e_y$, $e_z$, $e_{\theta x}$, $e_{\theta y}$, $e_{\theta z}$); 2) since the micro actuator does not have a guide device, the micro actuator may bear three forces and three torques, total six loads, however, when the micro actuator is adopted by a piezoelectric actuator, the piezoelectric actuator is not suitable for bearing a lateral force and a torque, which can affect the work performance of the micro actuator; 3) there is not a rotation guide rail disposed between the rotary worktable and the rotating body of the macro movement, all of six full loads of the rotary worktable are transmitted through the micro actuation mechanism, as a result, the rotary worktable cannot bear a large full load, which can only be applied to fields without loads $F_X$, $F_Y$, $F_Z$, $M_X$ and $M_Y$ or a micro load field, except that the actuation torque $M_Z$ depends on the selection of the micro piezoelectric actuator; and 4) the rest five precisions depend on the guide precision of the guide rail-pair between the rotating body of the macro movement and the housing of the macro movement, except that the precision of the rotating direction of the rotary worktable depends on the micro actuation mechanism, however, the guide precision of the guide rail pair of the macro movement is limited, thereby restricting improvement of the other five precisions of the rotary worktable.

Technical Solution

The purpose of the present disclosure is to provide a macro-micro actuated distended guide rail precision rotation apparatus, thereby solving the problems that a guide precision is low and a large full load can not bear in the prior art.

The technical solution adopted by the present disclosure is to provide a macro-micro actuated distended guide rail precision rotation apparatus, comprising a housing of a torque motor and a bearing housing both fixedly arranged on an upper surface of a base, a bearing sleeved on an inner edge step at the upper end of the bearing housing, the inner ring of the bearing is sleevingly connected to the intermediate rotating body, the lower end of the intermediate rotating body is connected to a bearing inner ring cap;

a round grating is provided at an outer edge of the lower end of the bearing inner ring cap;

a connecting piece is arranged on the upper surface of the housing of the torque motor, the lower end of the connecting piece is fixedly connected to a rotary shaft of the torque motor, the connecting piece and the intermediate rotating body are both connected to the lower end of the fine movement mechanism, the upper end face of the fine movement mechanism is fixedly connected to the rotary worktable.

Advantageous Effect

The advantageous effects of the present disclosure are: the precision of the linear movement of the piezoelectric actuator is improved and force situation thereof is better by disposing a linear movement distended guide rail; there is a total closed-loop control which can independently allow for a macro control or a micro control (the macro movement stops when fine movement is implemented, and the fine movement stops when macro movement is implemented) and can also allow for highly precise macro-and-micro linked control; the macro-and-micro combination allows for implementation of a precise location of great rotation range (more than 360 degree) and highly precise continuous rotation control of great rotation range; a rotation guide rail is disposed between the rotary worktable and the base so as to bear larger full load; a flexible hinge of the fine movement mechanism arranged to be symmetrical to a rotary shaft of the rotary worktable may compensate guide deviations of the rotation guide rail of the rotary worktable and improve the movement precision of the rotary worktable.

In figures, 1. Base, 2. Torque motor, 3. Bearing housing, 4. Round grating, 5. Bearing inner ring cap, 6. Bearing, 7. Bearing outer ring cap, 8. Intermediate rotating body, 9. Connecting piece, 10. Fine movement mechanism, 11. Gasket, 12. Piezoelectric actuator, 13. Rotary worktable, 81. Cylinder, 82. Protrusions at two sides, 83. Groove, 101. Fixing body, 102. Moving body, 103. Rotating body, 104, Flexible hinge.

DETAILED DESCRIPTION OF EXEMPLARY EMBODIMENTS

Hereinafter, the present disclosure is described in detail in conjunction with the accompanying drawings and the detailed description.

The present disclosure is to provide a macro-micro actuated distended guide rail precision rotation apparatus, in which the torque motor and the piezoelectric actuator are connected to macro-micro actuation and the flexible hinge in series.

Figure 1:
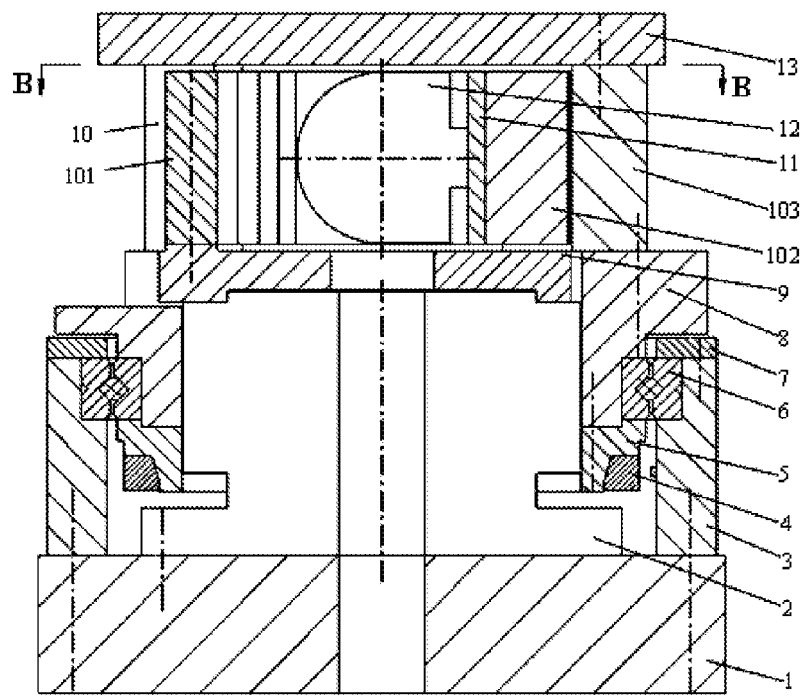
FIG. 1 is a structural view of embodiment 1 for the rotation apparatus of the present disclosure.
Figure 2:
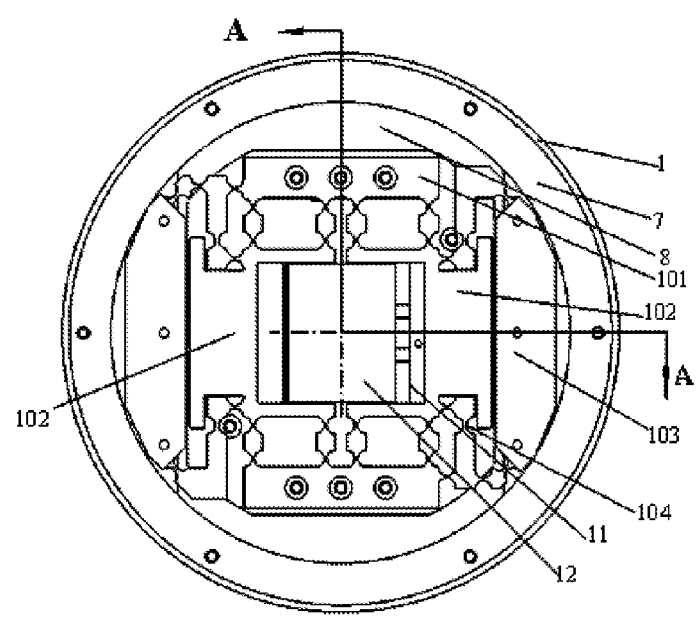
FIG. 2 is a top view of B-B cross-section in FIG. 1.

As illustrated in FIGS. 1 and 2, the structure of the macro-micro actuated distended guide rail precision rotation apparatus of the present disclosure is: a housing of a torque motor 2 and a bearing housing 3 both fixedly arranged on an upper surface of a base 1, a bearing 6 sleeved on an inner edge step at the upper end of the bearing housing 3, a bearing outer ring cap 7 is press-fitted on the upper face of an outer ring of the bearing 6, an inner ring of the bearing 6 is sleevingly connected to an intermediate rotating body 8, a lower end of the intermediate rotating body 8 is connected to a bearing inner ring cap 5, the bearing inner ring cap 5 is fixedly connected to the intermediate rotating body 8 and respectively compresses tightly the lower and upper faces of the inner ring of the bearing 6, the bearing outer ring cap 7 is fixedly connected to the bearing housing 3, compress tightly the upper face of the outer ring of the bearing 6 and compress tightly the lower face of the outer ring of the bearing with the step face of the bearing housing 3;

a round grating 4 is provided at an outer edge of the lower end of the bearing inner ring cap 5, a grating scale of the round grating 4 is fixedly arranged on the bearing inner ring cap 5, a reading head of the round grating 4 is fixedly arranged on the bearing housing 3 to compose a total closed-loop control of the macro-micro actuation;

a connecting piece 9 is arranged on the upper surface of the housing of the torque motor 2, the lower end of the connecting piece 9 is fixedly connected to a rotary shaft of the torque motor 2, the connecting piece 9 and the intermediate rotating body 8 are both connected to the lower end of a fine movement mechanism 10.

FIG. 1 is also an A-A cross section in FIG. 2

Figure 3:
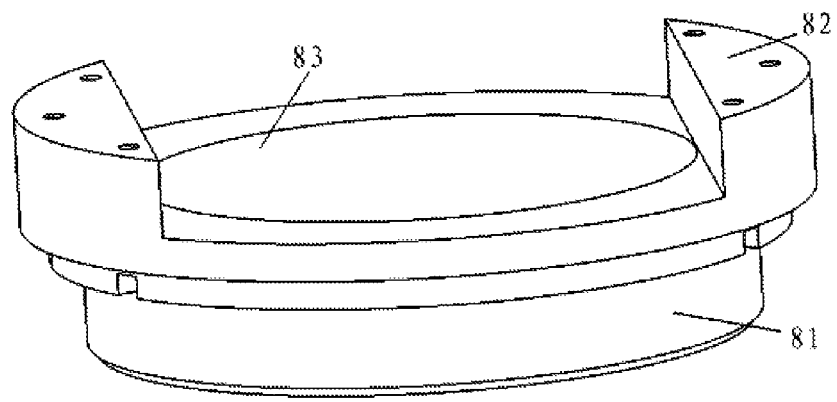
FIG. 3 is a structural view of the intermediate rotating body in the apparatus of the present disclosure.

Referring to FIG. 3, the structure of the intermediate rotating body 8 includes a cylinder 81 having a through hole, protrusions 82 are disposed at two sides of the diameter of the cylinder 81, a groove 83 is disposed on an upper end of the through hole of the cylinder 81.

Figure 4:
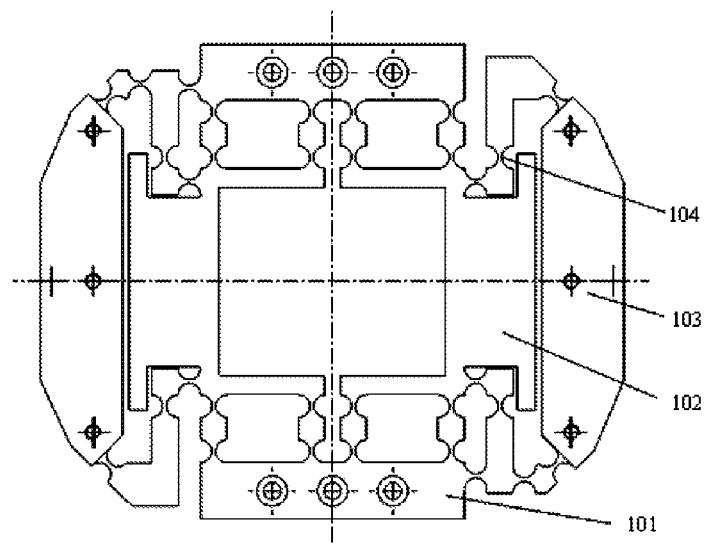
FIG. 4 is a structural view of the fine movement mechanism in the apparatus of the present disclosure.

Referring to FIGS. 2 and 4, the fine movement mechanism 10 includes a pair of fixing bodies 101 and a pair of rotating bodies 103 sequentially arranged at circumference by symmetrical intervals, a moving body 102 is disposed in an intermediate space surrounded by the pair of fixing bodies 101 and the pair of rotating bodies 103, a piezoelectric actuator 12 is disposed in an inner cavity of the moving body 102, the fixing bodies 101 are fixedly connected to an upper end face of the connecting piece 9; the fixing body 101 and the moving body 102 and the moving body 102 and the rotating body 103 are connected through a plurality of flexible hinges 104, respectively; the lower end faces of two rotating bodies 103 are respectively fixedly connected to the protrusions 82 at two sides of the upper end of the intermediate rotating body 8, the upper end faces of the rotating bodies 103 are fixedly connected to a rotary worktable 13. The connecting piece 9 is disposed in a groove 83 of the intermediate rotating body 8 but does not contact the circumference of the groove 83.

The bearing 6 is used as a rotation guide rail between the rotary worktable 13 and the base 1, the rotation guide rail is adopted by a cross roller bearing, a combined needle bearing, a static pressure bearing or an air flotation bearing; the rotation guide rail disposed between the rotary worktable and the base can bear a large full load; a flexible hinge may compensate the guide deviations of the rotation guide rail of the rotary worktable and improve the movement precision of the rotary worktable.

In the apparatus of the present disclosure, the stretch of the piezoelectric actuator pushes the moving body of the fine movement mechanism to perform a small linear movement, the flexible hinges arranged to be symmetrical to both sides of a shaft of the piezoelectric actuator compose a distended guide rail for moving linearly to guide the linear movement of the piezoelectric actuator, thereby improving the movement precision of the fine movement and avoiding (or reducing) the lateral force and the torque which the piezoelectric actuator bears; the flexible hinge arranged to be symmetrical to the rotary shaft of the rotary worktable converts the small linear movement of the piezoelectric actuator and the moving body of the fine movement mechanism which is fixedly connected to the piezoelectric actuator into a small rotation movement of the rotating body of the fine movement mechanism and the rotary worktable which is fixedly connected to the rotating body of the fine movement mechanism, and meanwhile can also compensate guide deviations ($e_x$, $e_y$, $e_z$, $e_{\theta x}$, $e_{\theta y}$) of the rotation guide rail of the rotary worktable and improve the movement precision of the rotary worktable.

What is claimed is:

1. A macro-micro actuated distended guide rail precision rotation apparatus, comprising:

a base, a torque motor having a stationary portion affixed to the base and a rotary output, a bearing housing affixed to the base surrounding the torque motor and having a bearing axis in substantially co-axial alignment with a motor rotary output, a bearing having a fixed and a rotatable ring with the fixed ring connected to the bearing housing, a bearing outer ring cap fixedly arranged on an upper surface of the fixed ring of the bearing, a bearing inner ring cap fixedly arranged on a lower surface of the rotatable ring of the bearing, an intermediate rotating body connected to the bearing inner ring cap, a round grating provided at an outer edge of the bearing inner ring cap, a connecting piece connected to the rotary output of the torque motor, a fine movement mechanism having a fixed body portion attached to the connecting piece, a rotating body portion attached to the intermediate rotating body and a moving body portion connected to the fixed body portion and the rotating body portion by flexible hinges that enable the rotating body portion to move a limited amount in a direction radial to the bearing axis, a piezoelectric actuator cooperating with the fine movement mechanism to make micro-adjustments to the relative position of the rotating body portion to the fixed body portion, a gasket fixed between the moving body portion of the fine movement mechanism and the piezoelectric actuator, and a rotary worktable affixed to the rotation body of the fine movement mechanism, wherein:

the stationary portion of the torque motor and the bearing housing are both fixedly arranged on an upper surface of the base, the bearing outer ring cap is retained on an annular inner edge step at an end of the bearing housing, with the bearing inner ring cap connected at an annular outer edge step to the intermediate rotating body;

the connecting piece is fixedly connected to the rotary output of the torque motor, the connecting piece and the intermediate rotating body are both connected to a lower end of the fine movement mechanism, and an upper end face of the fine movement mechanism is fixedly connected to the rotary worktable.

2. The macro-micro actuated distended guide rail precision rotation apparatus of claim 1, wherein the intermediate rotating body comprises: cylinder having a through hole, protrusions disposed at two sides of the cylinder in a diameter direction, and a cylindrical wall disposed on an upper end of the through hole of the cylinder.

3. The macro-micro actuated distended guide rail precision rotation apparatus of claim 1, wherein the fine movement mechanism comprises a pair of the fixed body portions, a pair of moving body portions, a pair of the rotating body portions and a plurality of the flexible hinges interconnecting the body portions, wherein, the pair of fixed body portions and the pair of rotating body portions are sequentially and symmetrically arranged at circumferential intervals;

the moving body portions are disposed in an intermediate space surrounded by the pair of fixed body portions and the pair of rotating body portions; wherein the piezoelectric actuator is disposed in an inner cavity between the moving body portions;

the fixed body portions are fixedly connected to an upper end face of the connecting piece, lower end faces of two rotating body portions are respectively fixedly connected to protrusions at two sides of an upper end of the intermediate rotating body, and upper end faces of the rotating body portions are fixedly connected to the rotary worktable.

4. The macro-micro actuated distended guide rail precision rotation apparatus of claim 1, wherein a grating scale of the round grating fixedly arranged on the bearing inner ring cap, and a reading head of the round grating fixedly arranged on the bearing housing.

5. The macro-micro actuated distended guide rail precision rotation apparatus of claim 1, wherein the bearing used as a rotation guide rail between the rotary worktable and the base, and is one of a cross roller bearing, a combined needle bearing, a static pressure bearing or an air flotation bearing.

* * * * *